United States Patent [19]
Toshiyuki

[11] Patent Number: 5,396,254
[45] Date of Patent: Mar. 7, 1995

[54] POSITION RECOGNITION SYSTEM AND POSITION-COORDINATE CONVERTING DEVICE

[75] Inventor: Teshigawara Toshiyuki, Iseaki, Japan
[73] Assignee: Sanden Corporation, Gunma, Japan
[21] Appl. No.: 789,831
[22] Filed: Nov. 8, 1991
[30] Foreign Application Priority Data
   Nov. 8, 1990 [JP] Japan ................. 2-303405
[51] Int. Cl.⁶ ............... H04B 7/185; G01S 5/02
[52] U.S. Cl. ................... 342/357; 342/457; 340/990; 340/995
[58] Field of Search ......... 342/357, 457; 340/990, 340/995

[56] References Cited
U.S. PATENT DOCUMENTS
4,525,717 7/1985 Wildermuth et al. ............ 342/452
4,873,513 10/1989 Soults et al. ................. 340/723

Primary Examiner—Theodore M. Blum
Attorney, Agent, or Firm—Banner, Birch, McKie & Beckett

[57] ABSTRACT

A position recognition system is disclosed which includes a map divided into a plurality of areas, and area information corresponding to each area. A position-coordinate converting device includes a position detector for detecting a position as coordinates corresponding to a predetermined standard point. A map information memory card stores the area information of the map and coordinates corresponding to the predetermined standard point as map information. A CPU operates on the area information based on the detected results of the position detector and the map information stored in the map information memory card. An indicator indicates the operational results of the CPU.

14 Claims, 7 Drawing Sheets

FIG. 6

| NAME OF ATLAS | MNo | GUNMA | |
|---|---|---|---|
| UNIT LENGTH | a | 2.5 km | |
| SMALL UNIT LENGTH | b | 500 m | |

| LARGE AREA No. i | AREA STANDARD POINT Q | | SPREAD OF PAGE No. P | NAME OF ATLAS MN |
|---|---|---|---|---|
| | NORTH LATITUDE i | EAST LONGITUDE i | | |
| 1 | 44°00' | 144°00' | — | HOKKAIDO |
| 777 | 36°53' | 139°13' | 3 | GUNMA |
| 778 | 36°53' | 139°00' | 7 | GUNMA |
| 779 | 36°53' | 138°47' | 17 | GUNMA |
| 780 | 36°53' | 138°34' | 27 | GUNMA |
| 810 | 35°35' | 139°00' | 38 | GUNMA |
| XXXX | 33°00' | 128°00' | — | GUNMA |

FIG. 7(a)

> EAST LONGITUDE 139° 01' 45"
> NORTH LATITUDE 36° 41' 20"

FIG. 7(b)

> GENZAIICHI NAGASAKI

FIG. 7(c)

> GENZAIICHI GUNMA
> P25      B. 2-1.3

POSITION RECOGNITION SYSTEM AND POSITION-COORDINATE CONVERTING DEVICE

TECHNICAL FIELD

The present invention relates to a position recognition system and a position-coordinate converting device which can be easily operated.

BACKGROUND OF THE INVENTION

A conventional device for determining a position which uses a Global Positioning System (G.P.S.) is well known. In such a system, a person can determine the longitude and latitude of their position by receiving radio signals from a plurality of satellites with a G.P.S. receiver. Then, the person can determine their position by comparing a map with the longitude and latitude information from the receiver. One example of such a well known system is a commercially available LORAN navigation system.

However, it is not easy to determine one's position by comparing a map with longitude and latitude information. It is accordingly necessary for the person to have a particular level of skill.

FIG. 2 illustrates a block diagram of the function of a conventional driving guide device for a vehicle which uses a G.P.S. receiver 1. Map data is stored in CD-ROM 2 or other memory media (e.g., magnetic tapes). The position from G.P.S. receiver 1 is compared by central operational portion 3 with the map data of CD-ROM 2 and the longitude and latitude information from recover 1, and position is indicated on display 6 together with the map through portrait memory 4 and indication control portion 5. Accordingly, one's position can be easily recognized. An example of such a system is the commercially availabel Bosch travelpilot.

However, it is necessary in the above driving guide device for a vehicle to use an expensive memory media, (e.g., CD-ROM) which can memorize a large quantity of information. Such memory media are very expensive, and devices using these memory media are not in widespread use.

SUMMARY OF THE INVENTION

It is a primary object of this invention to provide a position recognition system and a position-coordinate converting device which can be easily operated.

It is another object of this invention to provide a position recognition system and a position-coordinate converting device which is inexpensive.

A position recognition system according to the present invention comprises a map divided into a plurality of areas and area information corresponding to each area. The map is composed of sheets of paper. A position-coordinate converting device includes position detecting means for detecting position as coordinates corresponding to a predetermined standard point. Map information storage means stores the area information of the map and coordinates corresponding to the predetermined standard point as map information. Coordinate operation means operates the area information based on the detected results of the position detecting means and the map information stored in the map information storage means. Indication means indicates the operational results of the coordinate operation means.

Further objects, features, and other aspects of this invention will be understood from the detailed description of the preferred embodiments of this invention with reference to the annexed drawings.

BRIEF DESCRIPTION OF THE DRAWINGS

FIG. 6 is a table illustrating map information as stored in a memory.

FIGS. 7(a)–7(c) are examples of displays shown on the indication device.

DETAILED DESCRIPTION OF THE PREFERRED EMBODIMENTS

Figure 1:
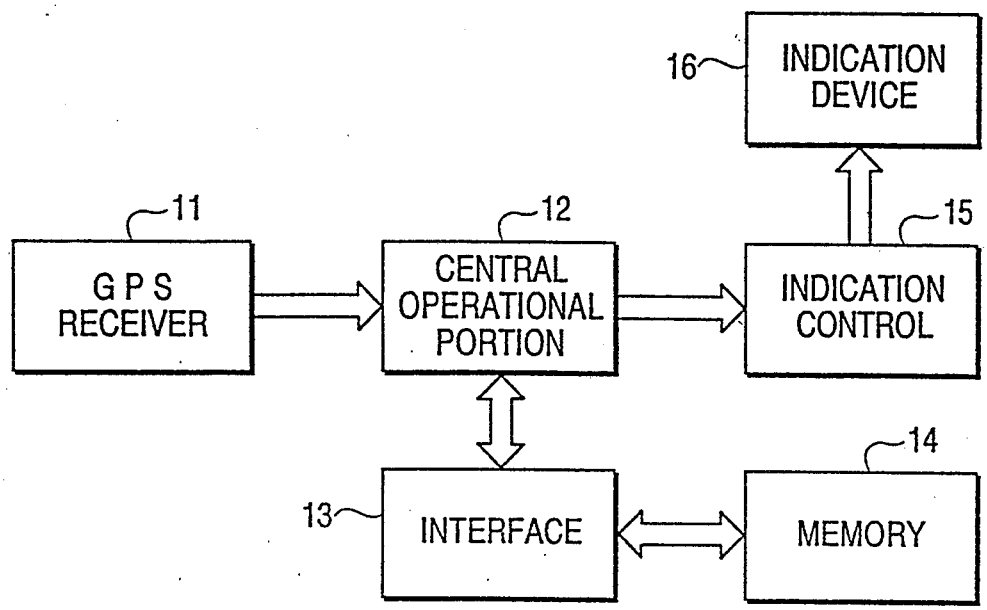
FIG. 1 is a block diagram of a position-coordinate converting device in accordance with one embodiment of the present invention.
Figure 2:
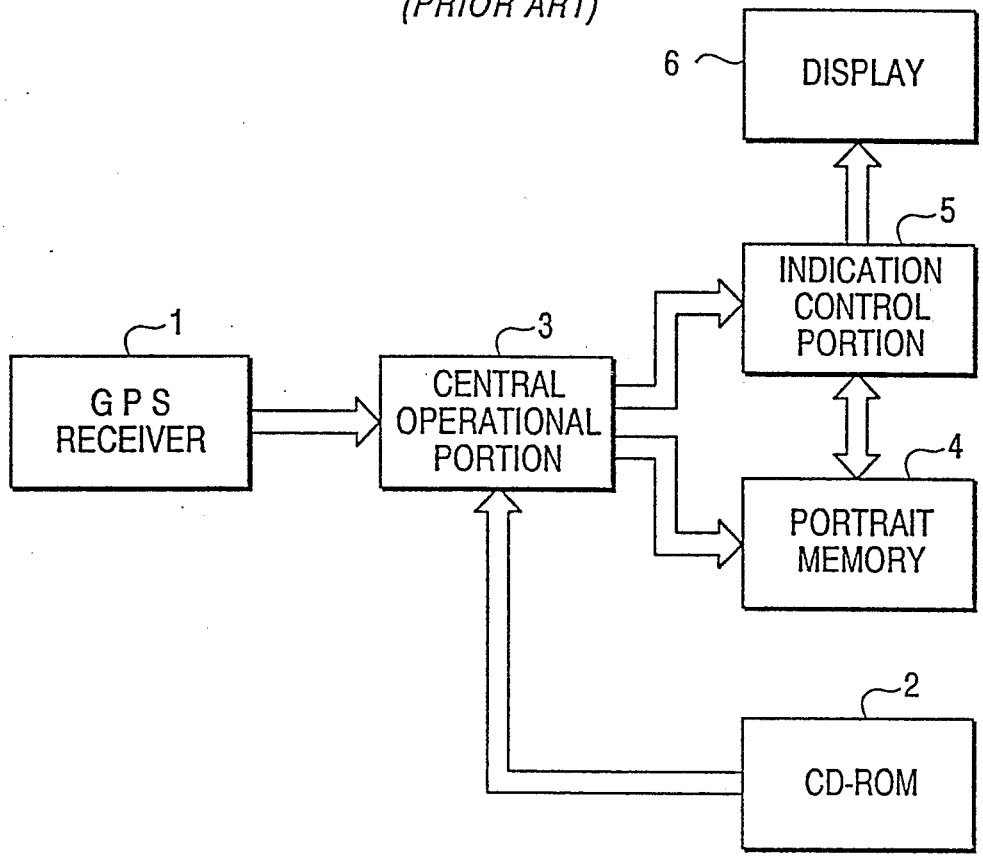
FIG. 2 is a block diagram of a prior art driving guide device for a vehicle.

FIG. 1 illustrates a block diagram of a position-coordinate converting device in accordance with one embodiment of the present invention.

Receiver 11 for G.P.S. connects to central operational portion 12. Central operational portion 12 couples with indication device 16 through indication control 15 and also couples with memory 14 through interface 13. Receiver 11 receives radio signals from a plurality of satellites and outputs position as longitude and latitude data to central operational portion 12 which includes a Central Processing Unit (CPU).

Memory 14 is composed of non-volatile memory (e.g., ROM). Predetermined data of a map are previously stored in memory 14 as map information. An atlas is made to correspond to each city and/or district. The map information of such an atlas is stored in memory 14.

Figure 3:
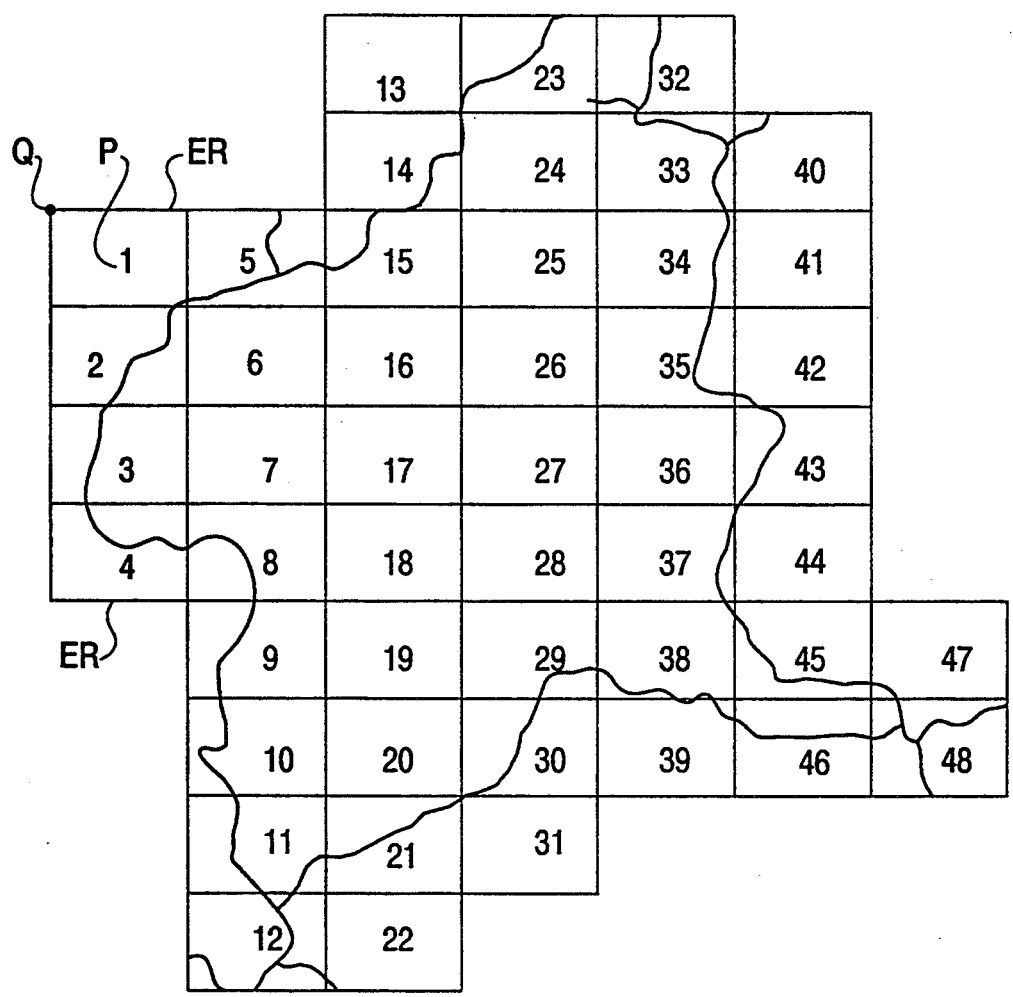
FIGS. 3–5 are graphs showing a map as used in the device shown in FIG. 1.
Figure 4:
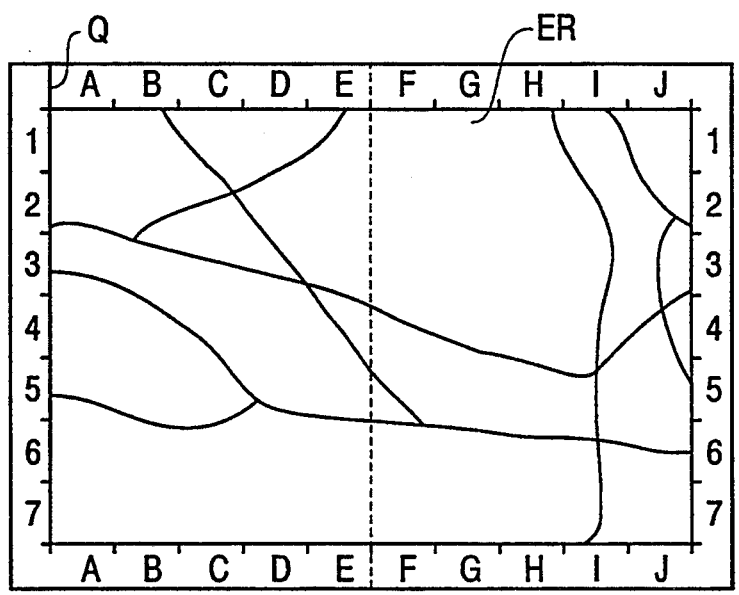
Figure 5:
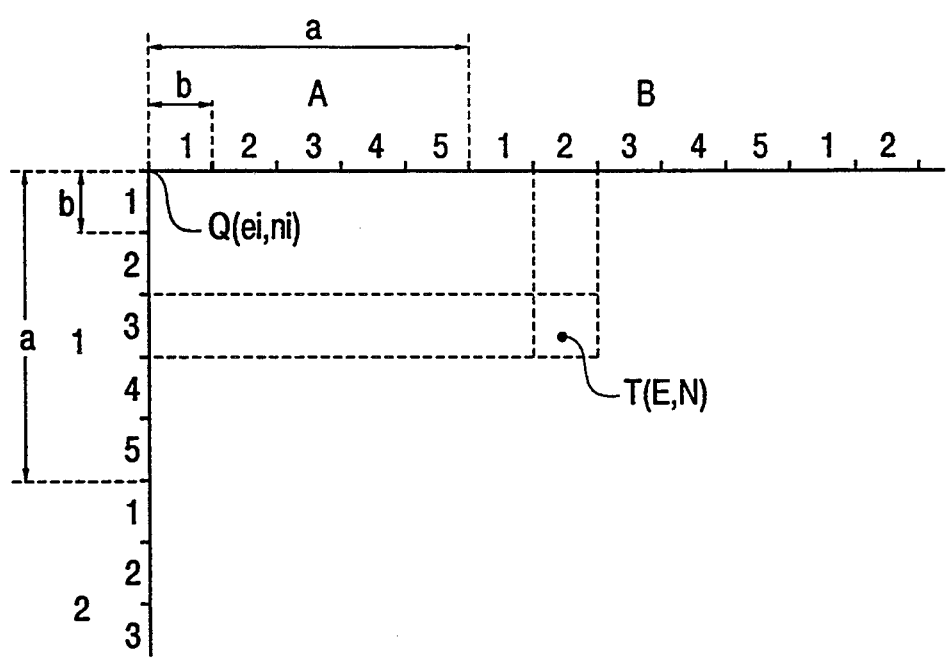

With reference to FIG. 3, Gunma prefecture, for example, is described and is divided into a plurality of large areas ER in the shape of a grid with longitude and latitude. The large areas ER do not overlap each other. A number is given to each large area ER indicating the corresponding page number of the atlas. Each large area ER, as shown in FIGS. 4 and 5, is printed within the atlas. Each coordinate A, B, C, etc. is put on the line parallel to a longitude by the unit length a and each coordinates 1, 2, 3, etc. is put on the line parallel to a latitude by the unit length a. The unit length a may be determined to be 2.5 km if the map is drawn, for example, on a scale of 1 to 50,000. In addition, if necessary, auxiliary coordinates 1, 2, 3, etc. may be respectively put on the lines along the longitude and latitude by the small unit length b. For example, the small unit length b may be predetermined to be 500 m. Accordingly, each large area ER is divided into a plurality of small areas which can be represented by the following coordinates: (A-1), (B-1), or (A.1-1.2), (B.2-1.2).

Memory 14 corresponding to the city and/or district, as shown in FIG. 6, stores the coordinates of area standard point Q of each areas ER (i.e., the longitude ei and latitude ni) and the name MN of an atlas including each large area ER in order of the number i of large areas ER. Each memory 14 further stores the name MNo of the atlas, unit length a, small unit length b and page number P of the atlas corresponding to a plurality of large areas ER in the city and/or districts.

Memory 14 may be any type of memory device such as a DRAM, PROM, EPROM, etc. The present invention, by reducing the map information to correspond to page numbers and coordinates of an atlas, vastly reduces the amount of memory required to store the map information. As such, memory 14 could comprise a removable memory card such as a so-called "smart card" which is a credit card sized device containing a microchip memory circuit. Separate memory cards could be provided for each city or district to correspond to an atlas for each district (e.g., Arlington County Road Atlas). Alternatively, several cities or districts could be provided on such a memory card.

Indication device 16 includes a liquid crystal indication device which can indicate, for example, two lines of sixteen characters each.

Figure 8:
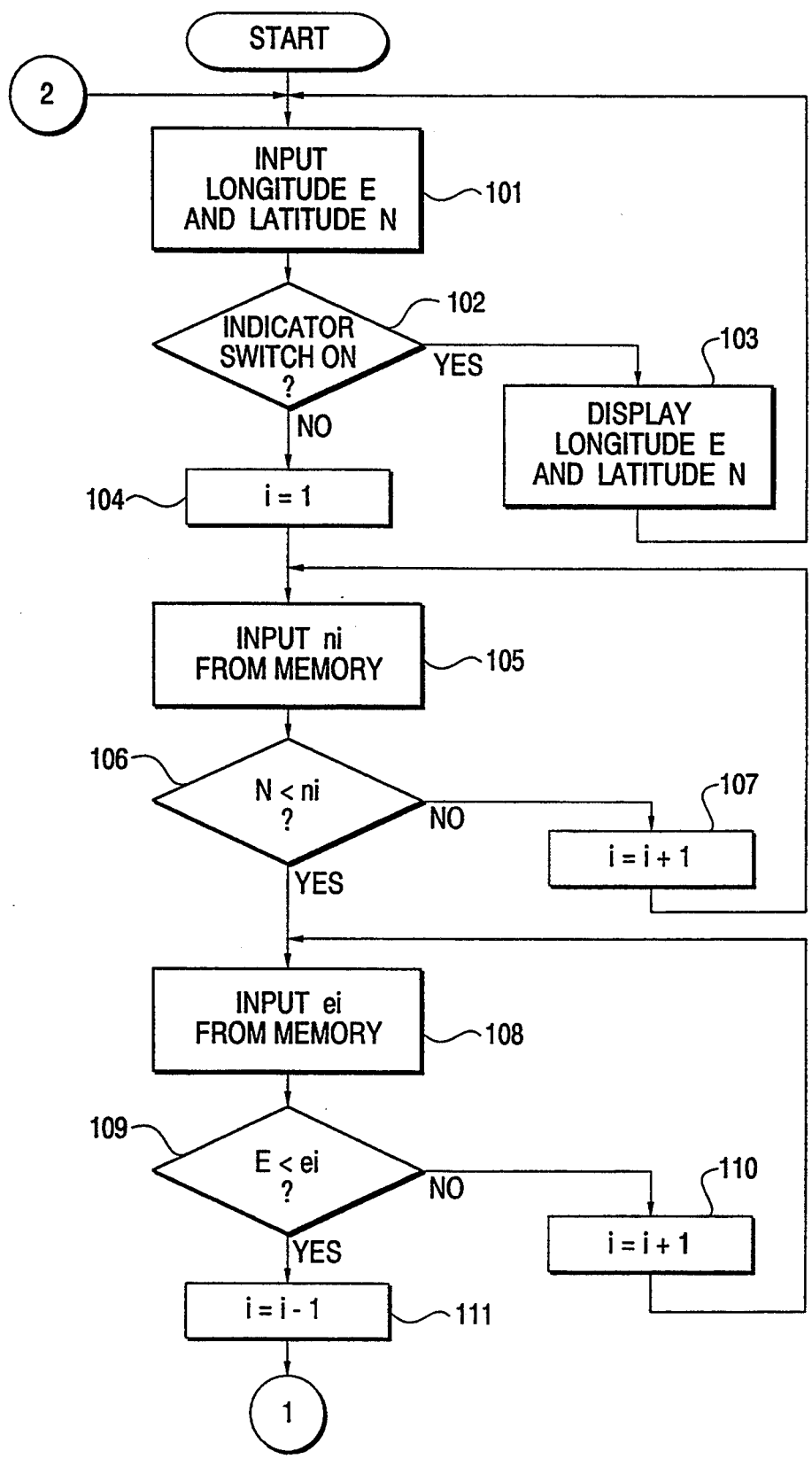
FIGS. 8 and 9 are flowcharts of the operation of the position-coordinate converting device.
Figure 9:
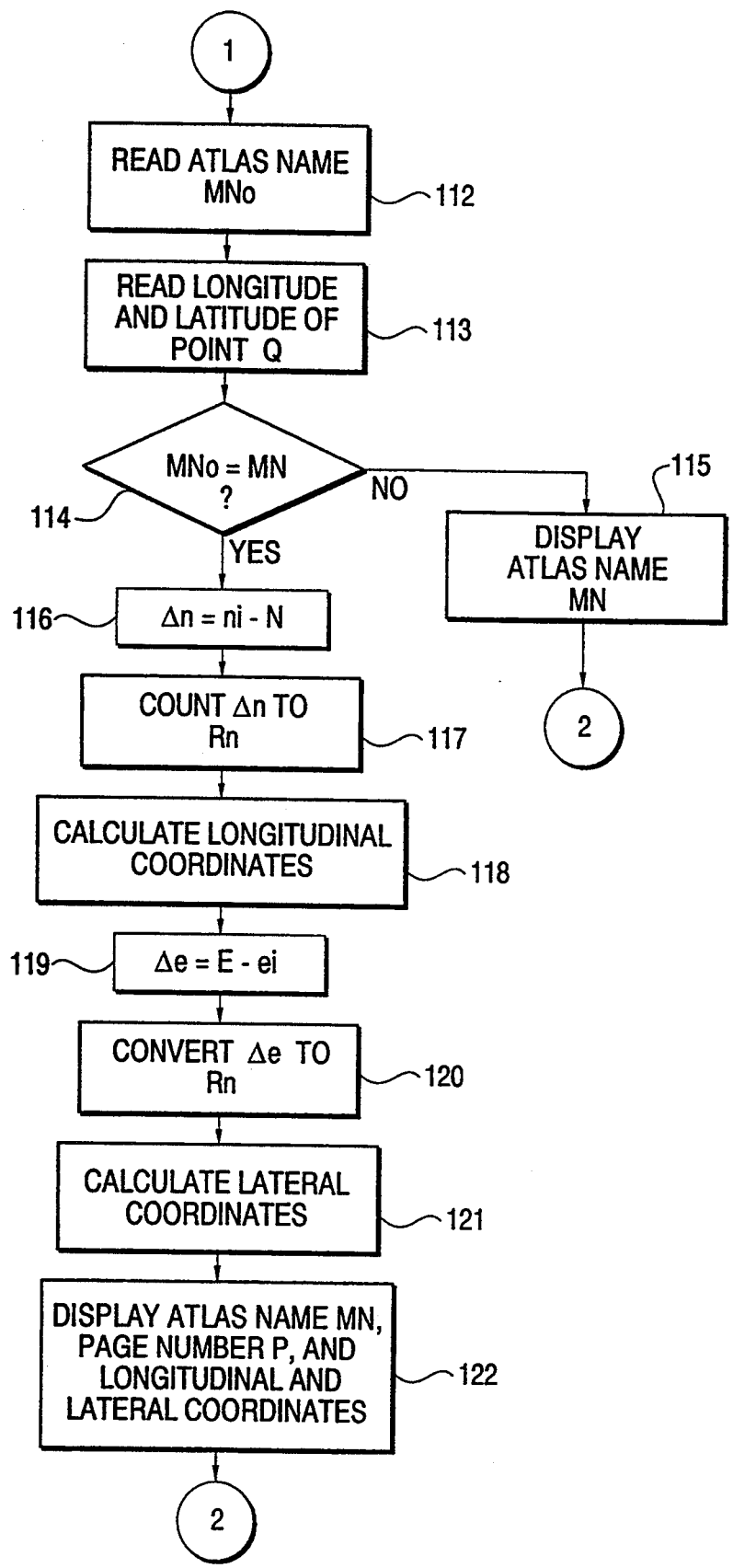

FIGS. 7(a)-7(c) illustrate examples of displays of indication device 16 and FIGS. 8 and 9 illustrate flowcharts of a control of a position coordinate converting device and a position recognition system respectively.

The data for longitude E and latitude N at the present position are inputted to central operational portion 12 through G.P.S. receiver 11 (step 101). It is determined whether indication changing switch, which is not shown, is turned on or not (step 102). If the switch is turned on, control moves to step 103, and longitude E and latitude N as shown in FIG. 7(a) are indicated on indication device 16 based on a control from indication control 15. Thereafter, control returns to step 101. If the switch is not turned on, a variable i is predetermined to be 1 (step 104), and latitude ni corresponding to area standard point Q of large area ER which is number i is read into central operation point 12 from memory 14 (step 105). Then, it is determined whether latitude N is leas than latitude ni or not (step 106). If latitude N is greater than or equal to latitude ni, number 1 is added to variable i (step 107), and a control returns to step 105. Otherwise, longitude ei corresponding to area standard point Q of a large area ER which is number i is read into central operation point 12 from memory 14 (step 108). Then, it is determined whether longitude E is less than longitude ei or not (step 109). If longitude E is greater than or equal to longitude ei, number 1 is added to variable i (step 110), and a control returns to step 108. Otherwise, the number 1 is subtracted from variable i, and then name NMo of an atlas is read into central operational point 12 from memory 14 (step 112). Thereafter, central operational portion 12 further reads the longitude and latitude corresponding to area standard point Q of a large area ER which is number 1, page number P, name MNo of an atlas and the other data (step 113), and it is determined whether name MNo of an atlas is equal to name MN of an atlas or not (step 114). If the name MNo is different from the name MN, as shown in FIG. 7(b), characters "GENZAIICHI", which means the present position in Japanese, and name MN of an atlas including large areas ER, which is the number i, are indicated on indication device 16 (step 115), and a control returns to step 101. Otherwise, the coordinates on the longitudinal and lateral axles of the atlas are calculated based on the difference between longitude ei and latitude ni of area stand point Q and longitude E and latitude N of the present position T. That is, central operational portion 12 subtracts latitude N of the present position T from latitude ni of area standard point Q, and the difference therebetween is Δn (step 116). Central operation portion 12 converts difference Δn into distance Rn on the surface of the earth (step 117).

For example, if latitude ni of area standard point Q is 36 degrees 42 minutes 00 seconds and latitude N of the present position T is 36 degrees 41 minutes 20 seconds, the difference Δn of the latitude is 40 seconds as described in equation (1). 40 seconds are about 0.0111 degrees.

$$\Delta n = (36° \ 42' \ 00'') - (36° \ 41' \ 20'') \\ = 40'' \cdot 0.0111° \tag{1}$$

Further, if the radius r is of the earth is 6378 km, distance Rn on the surface of the earth is calculated from the following equation (2):

$$Rn = 0.0111°/360° \times 2\pi r \\ = 1.24 \text{ km} \tag{2}$$

Thereafter, central operational portion 12 calculates the coordinates on the longitudinal axis of the atlas from the above distance Rn (step 118). That is, distance Rn is divided with unit length a, i.e., 2.5 km, and longitudinal coordinates are given by raising a decimal of the calculated figure to one unit as described in equation (3). Since unit length a is divided with small unit length b into five equal parts, the small unit length b is given by multiplying the values less than a decimal point by five and by raising a decimal of the multiplied figure to one unit.

$$1.24/2.5 = 0.496 \cdot 1 \tag{3}$$

$$0.496 \times 5 - 2.48 \cdot 3 \tag{4}$$

Then, central operational portion 12 subtracts longitude ei of area standard point Q from longitude E of the present position T, and the difference therebetween is Δe (step 119). Central operational portion 12 converts difference Δe into distance Rn on the surface of the earth (step 120).

For example, if longitude ei of area standard point Q is 139 degrees 00 minutes 00 seconds and longitude E of the present position T is 139 degrees 02 minutes 10 seconds, the difference e of the longitude is 02 minutes 10 seconds as described in equation (5). 2 minutes 10 seconds are about 0.0361 degrees.

$$\Delta e = (139° \ 02' \ 10'') - (139° \ 00' \ 00'') \\ = 02' \ 10'' \cdot 0.0361 \tag{5}$$

Distance Re on the surface of the earth is calculated from the following equation (6):

$$Re = 0.0361°/360 \times 2\pi \times \cos(36° \ 41' \ 20'') \\ = 3.22 \text{ km} \tag{6}$$

wherein (36°0 41'20") is longitude of area standard point Q.

Thereafter, central operational portion 12 calculates the coordinates on the lateral axis of the atlas from the above distance Re (Step 121). That is, distance Re is divided with unit length a, i.e., 2.5 km, and lateral coordinates are given by raising a decimal of the calculated figure to one unit as described in equation (7). Since unit length a is divided with reduced unit length b into five equal parts, the reduced unit length b is given by multiplying the values less than a decimal point by five and by raising a decimal of the multiplied figure to one unit.

$$3.22/2.5 = 1.288\cdot 2 \qquad (7)$$

$$0.288 \times 5 = 1.44\cdot 2 \qquad (8)$$

Central operation portion 12 instructs indication device 16 to indicate character "GENZAIICHI", the name of the atlas, the page number of the area ER, and the longitudinal and lateral coordinates, as shown in FIG. 7(c), through indication control 15 (step 122), then control returns to step 101.

The lateral coordinates are indicated by letters to be distinguished from the longitudinal coordinates. Accordingly, in this example, the lateral coordinates are B.2 since the letter corresponding to 2 is B.

The accuracy of a G.P.S. receiver is within the range of ± 100 m. Accordingly, position can be recognized at high accuracy.

In the above embodiments, one side of an area of an atlas is predetermined to be 2.5 km or 500 m and the area is predetermined to be a square. In the mountains, it is enough to recognize the position if we can see the land within a square, of which the side is 2.5 km, on the atlas.

Likewise, an atlas and a memory card corresponding to each metropolis and districts are used in this embodiment. The information of the all metropolis and districts, of course, can be stored in one memory card. However, in this case, it is necessary to use a larger memory card, thus increasing the cost.

In addition, although a G.P.S. receiver is used as a position detecting device in this embodiment, data from a communication system on the road (e.g., beacon, signpost, etc.) can be used to determine position.

Further, although the examples illustrated herein use Japanese prefectures and cities, the present invention can be easily adapted to display data for regions and cities of other countries (e.g., city of Alexandria, Arlington County, etc.). In addition, the display of FIGS. 7(a)–7(c) can be easily adapted to display data in languages other than Japanese.

This invention has been described in detail in connection with a preferred embodiment. This embodiment, however, is merely for example only and the invention is not restricted thereto. It will be understood by those skilled in the art that other variations and modifications can easily be made within the scope of the invention, as defined by the appended claims.

It is claimed:

1. A position-coordinate converting device comprising:
   map information storage means for storing a plurality of areas, each area having a predetermined standard point in latitude/longitude format and a paper atlas page number corresponding thereto;
   position detecting means including a receiver for a Global Positioning System (G.P.S.) for detecting position and outputting a detected position in latitude/longitude format;
   corresponding means, coupled to said position detecting means, for corresponding said detected position to one of said plurality of areas stored in said map information storage means and retrieving its corresponding paper atlas page number by comparing said detected position with one or more of said predetermined standard points;
   coordinates operation means, coupled to said position detecting means, said corresponding means and said map information storage means, for computing a location within said one area by converting said detected position into lateral and longitudinal designations corresponding to predetermined axis markings on said paper atlas which are within said one area; and
   indication means, coupled to said coordinates operation means, for indicating said corresponding paper atlas page number and said lateral and longitudinal designations within said one area.

2. A position determining system for determining a position comprising:
   a Global Positioning System (G.P.S.) receiver for receiving a radio signal from a plurality of satellites and outputting in response thereto a current position as latitude and longitude coordinates;
   memory means for storing a plurality of page numbers and map coordinates as latitudes and longitudes, each of said map coordinates corresponding to one of said page numbers, each said page number corresponding to a page of a paper map;
   computer means, coupled to said G.P.S. receiver and to said memory means, for receiving said current position, determining whether one of said plurality of map coordinates corresponds to said current position, and outputting in response thereto a determined page number, and for calculating a sub-area within a page of said paper map by computing lateral and longitudinal designators based on a difference between said detected position and said one of said plurality of map coordinates, and
   indication means, coupled to said computer means, for indicating said determined page number and said calculated sub-area.

3. The position determining system of claim 2 wherein said memory means comprises a memory card.

4. The position determining system of claim 2 wherein said corresponding map coordinates comprises an atlas name.

5. The position determining system of claim 2 wherein said indication means further comprises an indication control means for selectively determining whether to display one of said determined page number and said current position in latitude and longitude format.

6. The position determining system of claim 2, wherein each of said pages of said paper map is divided into a plurality of smaller square areas of a predetermined size;
   wherein said memory means further comprises means for storing said predetermined size;
   wherein said computer means further comprises means for determining, based on said map coordinates corresponding to said determined page number, said predetermined size read from said memory means, and said current position, which one of said plurality of smaller square areas is closest to said current position; and
   wherein said indicating means comprises means for displaying an identifier for said one closest smaller square area.

7. The position determining system of claim 6, wherein each of said smaller square areas is further divided into a plurality of smaller sub-units each of a second predetermined size;

wherein said memory means further comprises means for storing said second predetermined size;

wherein said computer means further comprises means for determining, based on said map coordinates corresponding to said determined page number, said second predetermined size read from said memory means, and said current position, which one of said plurality of sub-units is closest to said current position; and wherein said indicating means comprises means for displaying an identifier for said one closest sub-unit.

8. The position determining system of claim 7, wherein said indicating means displays said identifiers for said one closest smaller square area and said one closest sub-unit in the form X.n-Y.p, where X and Y identify said closest smaller square, and wherein n and p identify said closest sub-unit within said smaller square.

9. A position-coordinate converting device, comprising:

a G.P.S. receiver for receiving a satellite signal and outputting therefrom position coordinates in latitude/longitude format;

a position display for displaying a current position in a first display format comprising an atlas page number and an area indicator associated with said atlas page number, and a second display format comprising latitude/longitude coordinates;

a display controller, coupled to said position display, for allowing a user to select between said first display format and said second display format;

a memory comprising a plurality of areas, each area having a standard point represented in latitude/longitude coordinates and an atlas page number corresponding to a paper atlas page on which the area is depicted; and converting means, coupled to said G.P.S. receiver, said memory, said position display, and to said display controller, for locating in said memory one of said plurality of areas corresponding to said position coordinates received from said G.P.S. receiver, retrieving the atlas page number corresponding to said one located area, computing an area indicator within said located area, characterized by a lateral axis designator and a longitudinal axis designator, by calculating a difference between said received position coordinates and the standard point for said one located area and, responsive to said display controller, displaying either said page number and said area indicator or said received position coordinates on said position display.

10. The device according to claim 9, wherein said memory further comprises a first unit length a and a second unit length b each corresponding to a predetermined distance within each of said areas, and wherein said convening means computes said area indicator with reference to said first unit length a and said second unit length b.

11. The device according to claim 10, wherein said area indicator comprises a first sub-area indicator derived from said first unit length a and a second sub-area indicator derived from said second unit length b.

12. The device according to claim 9, wherein said memory further comprises an atlas name for each of said areas, wherein said position display further comprises means for displaying said atlas name, and wherein said converting means further retrieves the atlas name corresponding to said one located area and causes it to be displayed on said display device.

13. The device according to claim 9, wherein said memory comprises a removable memory card containing a microchip memory circuit.

14. The device according to claim 9, wherein said convening means computes said area indicator by dividing said difference, represented as a distance on the surface of the earth, by a predetermined unit length associated with axes on said paper atlas.

* * * * *